United States Patent
Lacko et al.

(10) Patent No.: US 9,446,852 B2
(45) Date of Patent: Sep. 20, 2016

(54) AIRCRAFT SYSTEMS AND METHODS FOR DETECTING NON-COMPLIANT PILOT ACTION

(71) Applicant: HONEYWELL INTERNATIONAL INC., Morristown, NJ (US)

(72) Inventors: Ivan Lacko, Cana (SK); Jiri Vasek, Brno (CZ); Petr Uhlir, Brno (CZ)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 176 days.

(21) Appl. No.: 14/030,426

(22) Filed: Sep. 18, 2013

(65) Prior Publication Data
US 2015/0081138 A1 Mar. 19, 2015

(51) Int. Cl.
G08G 5/00 (2006.01)
B64D 45/00 (2006.01)

(52) U.S. Cl.
CPC ............. *B64D 45/00* (2013.01); *G08G 5/0013* (2013.01); *G08G 5/0021* (2013.01)

(58) Field of Classification Search
CPC ............ B64D 45/00; B64D 2045/003; B64D 2045/0045; G08G 5/0013; G08G 5/0004; G08G 5/0008; G08G 5/0017
USPC .................................................. 701/3, 8, 9
See application file for complete search history.

(56) References Cited

U.S. PATENT DOCUMENTS

| | | | |
|---|---|---|---|
| 5,416,705 A * | 5/1995 | Barnett ................... | G01C 23/00 340/10.42 |
| 5,844,503 A | 12/1998 | Riley et al. | |
| 5,926,790 A | 7/1999 | Wright | |
| 6,236,913 B1 * | 5/2001 | Bomans ................... | G01C 23/00 244/221 |
| 6,380,869 B1 * | 4/2002 | Simon ................... | G08G 5/0091 340/945 |

(Continued)

FOREIGN PATENT DOCUMENTS

| | | |
|---|---|---|
| CN | 1372127 A | 10/2002 |
| CN | 101996474 B | 10/2012 |
| EP | 2674926 A1 | 12/2013 |

OTHER PUBLICATIONS

Barbato, G.; Integrating Voice Recognition and Automatic Target Cueing to Improve Aircrew-System Collaboration for Air-to-Ground Attack; Air Force Research Laboratory, Wright-Patterson AFB, Ohio, USA; Paper presented at the RTO SCI Symposium on Sensor Data Fusion and Integration of the Human Element, held in Ottawa, Canada, Sep. 14-17, 1998, and Published in RTO MP-12.

(Continued)

*Primary Examiner* — Stephen Holwerda
(74) *Attorney, Agent, or Firm* — Lorenz & Kopf, LLP

(57) ABSTRACT

Aircraft systems and methods for detecting non-compliant pilot action are provided. The method includes analyzing an outbound communication from an aircraft to recognize a word or phrase corresponding to a parameter associated with a prior request for pilot action. If the word or phrase is recognized, the method further includes storing data corresponding to the outbound communication in a data storage device. The stored data and pilot action taken are compared to determine if there is a discrepancy between the pilot action and the stored data. A discrepancy alert is outputted if the discrepancy is determined to exist. A predetermined time interval is timed from the outbound communication. A timeout alert is outputted at a timeout of the predetermined time interval unless the requested pilot action is taken within the predetermined time interval.

16 Claims, 6 Drawing Sheets

(56) References Cited

U.S. PATENT DOCUMENTS

| | | | |
|---|---|---|---|
| 6,720,890 | B1 | 4/2004 | Exroni et al. |
| 6,885,921 | B1 | 4/2005 | Farmer |
| 7,089,108 | B2 | 8/2006 | Merritt |
| 7,415,326 | B2 | 8/2008 | Komer et al. |
| 7,606,715 | B1 | 10/2009 | Krenz |
| 7,764,812 | B2 | 7/2010 | McQuaide, Jr. |
| 7,809,405 | B1 * | 10/2010 | Rand .................. G08G 5/0013 455/431 |
| 7,912,592 | B2 | 3/2011 | Komer et al. |
| 8,370,157 | B2 | 2/2013 | Boregowda et al. |
| 8,514,104 | B1 | 8/2013 | Dirks et al. |
| 8,521,510 | B2 | 8/2013 | Gilbert et al. |
| 2003/0025682 | A1 * | 2/2003 | Dame .................. G08G 5/0021 345/184 |
| 2003/0034902 | A1 | 2/2003 | Dickau |
| 2003/0193408 | A1 | 10/2003 | Brown et al. |
| 2003/0204556 | A1 * | 10/2003 | Bernard .................. H04L 29/06 709/200 |
| 2004/0245409 | A1 | 12/2004 | Cordina |
| 2007/0241936 | A1 | 10/2007 | Arthur et al. |
| 2007/0288129 | A1 | 12/2007 | Komer |
| 2008/0114603 | A1 * | 5/2008 | Desrochers ............. G10L 15/22 704/275 |
| 2008/0221886 | A1 * | 9/2008 | Colin .................. G08G 5/0013 704/246 |
| 2009/0306839 | A1 | 12/2009 | Youngquist |
| 2009/0310530 | A1 | 12/2009 | Cerra |
| 2010/0027768 | A1 | 2/2010 | Foskett |
| 2011/0125503 | A1 * | 5/2011 | Dong ..................... G10L 15/22 704/275 |
| 2011/0313597 | A1 | 12/2011 | Wilson |
| 2016/0077523 | A1 | 3/2016 | Zygmant |

OTHER PUBLICATIONS

Helleberg, J. R. et al: "Effects of Data-Link Modality and Display Redundancy on Pilot Performance: An Attentional Perspective" The International Journal of Aviation Psychology, 13(3), 189-210, 2003, Lawrence Erlbaum Associates, Inc.

Zokić, M., et al.: "Say Again" International Journal of Education and Information Technologies, Issue 4, vol. 6, 2012.

EP Extended Search Report for Application No. 14182696.6 dated Mar. 16, 2015.

EP Extended Search Report for Application No. 14188558.2 dated Mar. 10, 2015.

USPTO Office Action for U.S. Appl. No. 14/080,187, date mailed May 25, 2016.

USPTO Office Action for U.S. Appl. No. 14/819,635 dated Aug. 10, 2016.

* cited by examiner

AIRCRAFT SYSTEMS AND METHODS FOR DETECTING NON-COMPLIANT PILOT ACTION

TECHNICAL FIELD

The present invention generally relates to avionic systems and more particularly relates to aircraft systems and methods for detecting non-compliant pilot action.

BACKGROUND

The cross-checking process is used in aviation environments to reduce the likelihood of errors. The ultimate goal of a crosscheck is to prevent errors related to execution of a collaborative decision via involving another party (human brain) into the action execution. The cross-checking process conventionally involves verbal and visual verification of an intended action in the cockpit prior to its execution. Even though cockpit systems are in many cases "smart" enough not to allow execution of a hazardous action by a flight crewmember (system-based crosscheck), many actions still rely on pilot verification of the action correctness (human-based crosscheck).

The cross-checking process is a vital element in a pilot's duties, particularly in a multi-crew situation. There is typically a minimum list of defined actions which are to be cross-checked. For example, air traffic control (ATC) clearances and other requests/instructions will normally be monitored by both pilots and consequent pilot action taken by the pilot flying (PF) will be confirmed or monitored by the pilot not flying (PNF). Equipment settings, such as altimeter pressure settings, cleared altitude, frequency change, and navigation routings are also typically set by the PNF and cross-checked by the PF, or vice versa. In Single Pilot Operations (SPO), there is no cross-checking second pilot.

Unfortunately, while the cross-checking process can significantly reduce the likelihood of errors, there are many examples where human-based cross-checking may not be adequate. The human mind is fallible and human error can occur for many reasons. For example, the cross-checking process may fail because of a misheard message, fatigue, a memory lapse, incorrect or incomplete appreciation of the situation, insufficient crosscheck, language barriers, distraction, communication problems, ineffective monitoring, data use error, non-compliance with Standard Operating Procedures (SOP), etc. Cross-checking errors are more likely in certain circumstances such as when there is pressure to complete an action quickly (e.g., to expedite departure or during an emergency or abnormal situation), but may also occur in normal daily situations.

Accordingly, it is desirable to provide aircraft systems and methods for detecting non-compliant pilot action. In addition, it is desirable to provide methods and systems for cross-checking compliance with a request for pilot action. Furthermore, other desirable features and characteristics of the methods and systems will become apparent from the subsequent detailed description and the appended claims, taken in conjunction with the accompanying drawings and the preceding background.

BRIEF SUMMARY

A method is provided for detecting non-compliant pilot action. In accordance with one exemplary embodiment, the method comprises analyzing an outbound communication from an aircraft to recognize a word or phrase corresponding to a parameter associated with a prior request for pilot action. If the word or phrase is recognized, the method further comprises storing data corresponding to the outbound communication in a data storage device. The stored data is compared with the pilot action to determine if a discrepancy exists between the pilot action and the stored data. A discrepancy alert is outputted if the discrepancy is determined to exist.

Methods are provided for detecting non-compliant pilot action in accordance with yet another exemplary embodiment of the present invention. The method comprises monitoring a dialog comprising an inbound communication from a ground location and an outbound communication from an aircraft relating to a request for pilot action. Data corresponding to the inbound communication is stored in a data storage device. The stored data relates to a requested parameter and a requested parameter value associated with the request for pilot action. An acknowledged parameter and acknowledged parameter value associated in the outbound communication is compared with the requested parameter and the requested parameter value in the stored data to determine if a discrepancy exists. A discrepancy alert is outputted if the discrepancy exists.

Systems are provided for detecting non-compliant pilot action, in accordance with yet another exemplary embodiment of the present invention. The system comprises a communications system configured to support an inbound communication from a ground location relating to a request for pilot action and an outbound communication from an aircraft comprising an acknowledgment of the request for pilot action. The request for pilot action is associated with a requested parameter and a requested parameter value and the acknowledgement is associated with an acknowledged parameter and an acknowledged parameter value. The system includes a data storage device containing a database with stored data relating to the request for pilot action and a processor coupled to the communications system and the data storage device to receive the stored data. The processor is configured to compare the stored data with the pilot action and determine if a discrepancy exists between the pilot action taken and the stored data and output a discrepancy alert if the discrepancy exists.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to methods and systems for detecting non-compliant pilot action. Such methods and systems provide an additional crosscheck, particularly helpful in Single Pilot Operations. By detecting non-compliant pilot action, the methods and systems as described herein help correct non-compliant pilot action, thereby resulting in increased flight safety and efficiency through more effective communications. While systems and methods for detecting non-compliant "pilot" action are hereinafter described, it is to be understood that such systems and methods may be used for detecting non-compliant action taken by a flight member other than the pilot. The request for pilot action may originate from a ground location such as air traffic control (ATC), or from another source. While the term "request" for pilot action is used herein, it is to be understood that any inbound communication to the aircraft that must be acknowledged in some manner by the pilot in an outbound communication from the aircraft is included, whether it is literally an "instruction", a "request", a "command", or the like. The term "pilot action" refers to the action that is taken by the "pilot" and intended to be compliant with the inbound communication from ATC or another source. In accordance with exemplary embodiment, "pilot action" refers to a parameter as hereinafter described and a value associated with the parameter (i.e., a "parameter value"). "Non-compliant pilot action" includes a failure to correctly follow an ATC request (i.e., a failure to take the correct pilot action), a failure to follow an ATC request after acknowledgement thereof by the pilot resulting in a timeout alert (i.e., a failure to take the pilot action), or both. The system may be utilized in aircraft, such as a helicopter, airplane, or unmanned vehicle. Moreover, exemplary embodiments of the system may also be utilized in spacecraft, ships, submarines, and other types of vehicles, in addition to machine operation. For simplicity, embodiments are described below with reference to "aircraft".

Figure 1:
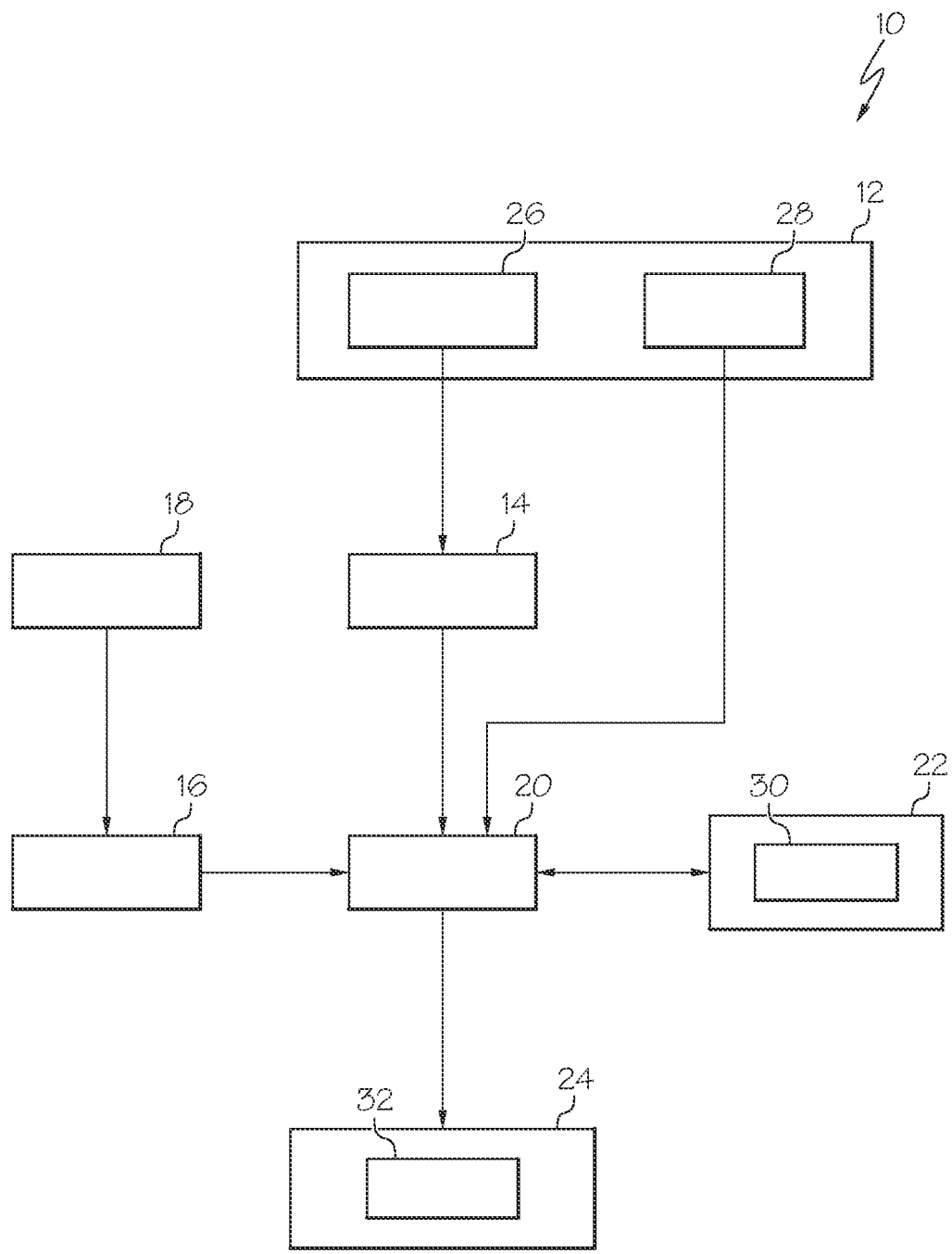
FIG. 1 is a schematic diagram of a computer-implemented system for detecting non-compliant pilot action, according to an exemplary embodiment of the present invention.

FIG. 1 is a simplified functional block diagram of a computer-implemented system for detecting non-compliant pilot action, according to exemplary embodiments of the present invention. System 10 includes multiple components each of which may be configured for mounting in aircraft. In some embodiments, system 10 may be a self-contained system such that each of the components described below are contained in a single housing and are dedicated exclusively to serving the functions of system 10. In other embodiments, the various components described below may be standalone components or they may be components that are used as part of other systems and which are configured to be used as a shared resource between such other systems and system 10.

In the embodiment illustrated in FIG. 1, the system 10 includes a communication system 12, a speech recognition module 14, a flight management system 16, a user interface 18, a processor 20, a data storage device 22, and a display device 24. In other embodiments, system 10 may include either additional or fewer components. The system 10 may be arranged as a single system on a data communications bus or systems bus or in an arrangement whereby one or more of the communications system, processor, the speech communication module, the database, the flight management system, the display device, and the user interface are separate components or subcomponents of another system located either onboard or external to an aircraft. It should be understood that FIG. 1 is a simplified representation of the system 10 for purposes of explanation and ease of description, and FIG. 1 is not intended to limit the application or scope of the subject matter in any way. In practice, while not illustrated, the system 10 and/or aircraft may include either additional or fewer devices, components, and databases for providing system functions and features, as will be appreciated in the art.

Still referring to FIG. 1, in an exemplary embodiment, the communication system 12 is suitably configured to support communications between the aircraft (e.g., the pilot) and ground location (e.g., ATC). The communication system may be realized using a radio communication system 26 and/or a datalink system 28 (as hereinafter described). The communication from the ground location to the aircraft is referred to herein as an "inbound communication". The communication from the aircraft to the ground location is referred to herein as an "outbound communication." The standard method of communication between ATC and the pilot is voice radio, using the radio communication system 26 such as either VHF bands for line-of sight communication or HF bands for long-distance communication. The radio communication system in the cockpit may include, for example, a conventional speaker and microphone that may be combined in an aviation headset (not shown), a radio receiver (not shown), and a push-to-talk (PTT) switch (not shown).

The sequence of messages between the aircraft and the ground location relating to a particular transaction (for example a request for pilot action and acknowledgment of the request) is termed a "dialog". There can be several sequences of messages in the dialog, each of which is closed by means of appropriate messages, usually of acknowledgement or acceptance. All exchanges of messages between the aircraft and the ground location can be viewed as dialogs. The messages may relate to a variety of parameters such as a heading, an altitude, attitude, flight level, QNH, etc. and a parameter value associated therewith. For example, the air traffic controller (ATCO) is provided with the capability to issue level assignments, crossing constraints, lateral deviations, route changes and clearances, speed assignments, radio frequency assignments, various requests for information, etc. The pilot is provided with the capability to acknowledge the request for pilot action, respond to messages, to request clearances and information, to report information, and to declare/rescind an emergency.

Controller-pilot data link communications (CPDLC) are digital communications and are another method of communication between the ATC and the pilot, using the datalink system 28 for such digital communication. For example, the ATC can select from a set of messages and send the digital communications to the aircraft (via the processor in this case). The flight crew will respond with an acknowledgment, such as ROGER, WILCO, STANDBY, or NEGATIVE. The pilot is, in addition, provided with the capability to request conditional clearances (downstream) and information from a downstream air traffic service unit (ATSU). A "free text" capability is also provided to exchange information not conforming to defined formats. An auxiliary capability is provided to allow a ground system to use the datalink system to forward a CPDLC message to another ground system. The cockpit includes a datalink control and display device (not shown) that serves as the CPDLC interface for sending and receiving CPDLC messages. The datalink system 28 sends digital signals from the CPDLC for processing by the processor as hereinafter described.

The speech recognition module 14 is known and generally comprises a speech input module configured to produce a digital signal derived from a voice communication, and a speech processing module operatively coupled to the speech input module. In some embodiments, the speech recognition module may include a dedicated processor, a microprocessor, circuitry, or some other processing component. The speech recognition module is configured to produce digital data that represents the parameter and parameter value corresponding to the voice communications between ATC and the pilot. The speech recognition module is configured to send the digital signal to the processor as hereinafter described.

The flight management system 16 is as known to one skilled in the art. The flight management system includes the flight guidance control system. The flight management system is coupled to the processor and may provide navigation data associated with the aircraft's current position and flight direction (e.g., heading, course, track, etc.) to the processor. The navigation data provided to the processor may also include information about the aircraft's airspeed, altitude, pitch, flight path, intended destination, takeoff and landing information, and other important flight information. For example, the flight management system may generate a flight plan for the aircraft that includes segments between waypoints forming a flight path to a destination. The flight management system may include any suitable position and direction determination devices that are capable of providing the processor with at least an aircraft's current position, the real-time direction of the aircraft in its flight path, the waypoints along the flight path, and other important flight information (e.g., elevation, pitch, airspeed, altitude, attitude, etc.). Information can be provided to the processor by, for example, an Inertial Reference System (IRS), Air-data Heading Reference System (AHRS), and/or a global positioning system (GPS).

Figure 5:
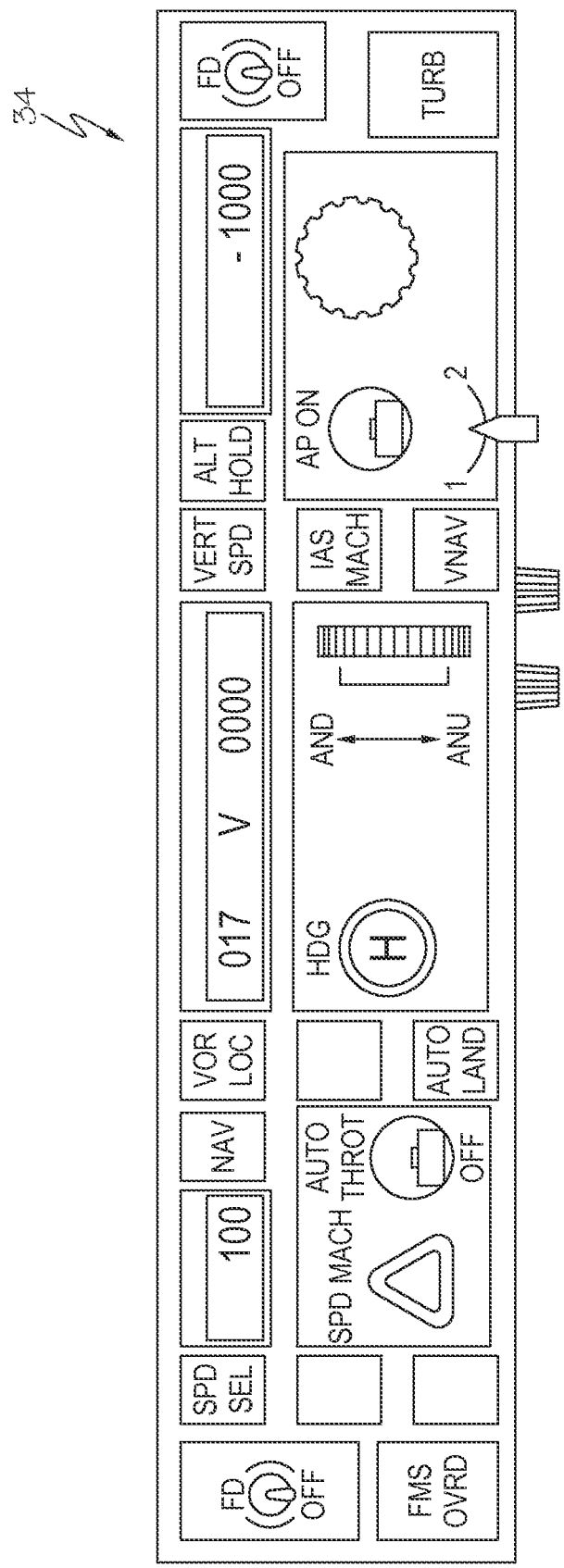
FIG. 5 depicts an exemplary flight guidance control panel.

In general, the user interface 18 (FIG. 1) is coupled to the flight management system 16 and is located within the cockpit of the aircraft. The pilot and flight management system are cooperatively configured to allow a user (e.g., a pilot or other flight crewmember) to interact with the flight management system 16 and other components of system 10 as hereinafter described. In accordance with an exemplary embodiment, the user interface may be realized as a flight guidance control panel 34 (FGCP) (or simply "guidance panel") as known in the art. An exemplary flight guidance control panel 34 is depicted in FIG. 5. The FGCP serves as an interface between the pilot and the flight management system 16. On the FGCP are controls and switches for setting different operational modes, parameters, and parameter values, etc. "Pilot action" may include the setting of parameters and parameter values on the guidance panel or elsewhere.

Processor 20 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 20 may comprise a single processor or a plurality of processors acting in concert. In some embodiments, processor 20 may be dedicated for use exclusively with system 10 while in other embodiments processor 20 may be shared with other systems on board the aircraft. In still other embodiments, processor 20 may be integrated into any of the other components of system 10. For example, in some embodiments, processor 20 may be a component of the speech recognition module.

Processor 20 is communicatively coupled to the datalink system 28, the speech recognition module 14, and the data storage device 22 and is operatively coupled to display device 24. Such communicative and operative connections may be effected through the use of any suitable means of transmission including both wired and wireless connections. For example, each component may be physically connected to processor 20 via a coaxial cable or via any other type of wire connection effective to convey electronic signals. In other embodiments, each component may be communicatively connected to processor 20 across a bus or other similar communication corridor. Examples of suitable wireless connections include, but are not limited to, a Bluetooth connection, a Wi-Fi connection, an infrared connection or the like.

Being communicatively and/or operatively coupled with the datalink system 28, the speech recognition module 14, data storage device 22, and display device 24 provides processor 20 with a pathway for the receipt and transmission of signals, commands, instructions, and interrogations to and from and each of the other components. Processor is configured (i.e., being loaded with and being capable of executing suitable computer code, software and/or applications) to interact with and to coordinate with each of the other components of system 10 for the purpose of detecting non-compliant pilot action as hereinafter described.

The processor accesses or includes the data storage device 22 containing a database 30 with digital data relating to the dialog (i.e., the inbound and outbound communications) between the aircraft and the ground location. The data storage device 22 may be a memory device (e.g., non-volatile memory, disk, drive, tape, optical storage device, mass storage device, etc.) that stores the data in the form of digital signals relating to the inbound and outbound communications. The digital signals represent such information as the source of the inbound communication (e.g., ATC, pilot), the parameter that is the subject of the request for pilot action (e.g., ALTITUDE, HEADING, ATTITUDE, FLIGHT LEVEL, QNH, SPEED, TRANSPONDER SETTING, FREQUENCY CHANGE, MONITOR, etc.), the parameter value (e.g., 180°, 10000 feet, etc.), and words or phrases associated with the acknowledgement of the request for pilot action (e.g., ROGER, WILCO, STANDBY, and NEGATIVE).

Generally, the processor 20 receives and/or retrieves avionics, navigation and flight management information (e.g., from the flight management system or communications system), and information relating to the inbound and outbound communications (e.g., from the speech recognition module, the datalink system, and from the data storage device). The processor is configured to compare the request for pilot action and the pilot action taken and determine if there is a discrepancy between the request for pilot action and the pilot action taken. The processor is also configured to output a discrepancy alert if, as a result of the comparison, a determination is made that there is a difference between the request for pilot action and the pilot action taken, as hereinafter described. For example, if the ATCO communicates a request for the pilot to fly heading 100°, and the pilot sets a heading of 110° (e.g., on the guidance panel 34), the processor outputs a discrepancy alert.

The processor 20 is also configured to compare the inbound and outbound communications of a dialog and determine if there is a discrepancy between them, that is not otherwise detected at or by the ground location. Processor is also configured to output a discrepancy alert if, as a result of the comparison, a determination is made that there is a difference between the inbound and outbound communications. For example, if the ATCO communicates a request for the pilot to fly heading 100° and the pilot acknowledges a heading of 110° (before taking any action), the processor would output a discrepancy alert because there is a difference between the inbound and outbound communications between the ATCO and the pilot.

The discrepancy alert outputted because of a difference between the request for pilot action and the pilot action or because of a difference between the inbound and outbound communications may be, for example, a visual discrepancy alert, an aural discrepancy alert, a tactile discrepancy alert, and combinations thereof, etc. It should be understood that the exemplary techniques for outputting the discrepancy alert described above are exemplary and do not comprise an exhaustive list of techniques that may be employed by processor to output the discrepancy alert(s).

The processor may function as a graphics display generator to generate display commands based on algorithms or other machine instructions stored in the processor or in separate memory components. The system also includes the display device 24 coupled to the processor. The display device may include any device or apparatus suitable for displaying flight information or other data associated with operation of the aircraft. In accordance with exemplary embodiments, the display commands may also represent visual discrepancy and timeout alerts. The processor generates the display commands representing this data, and sends the display commands to the display device if visual alerts are to be outputted.

In accordance with an exemplary embodiment, the display device 24 is an aircraft flight display located within a cockpit of the aircraft. The display device may be implemented using any one of numerous known display devices suitable for rendering textual, graphic, and/or iconic information in a format viewable by the pilot or other flight crew member. Non-limiting examples of such display devices include various cathode ray tube (CRT) displays, and various flat panel displays such as various types of LCD (liquid crystal display) and TFT (Thin Film Transistor) displays. The display device may additionally be implemented as a panel mounted display, a HUD (Head-Up Display) Projection, or any one of numerous known technologies. It is additionally noted that the display device may be configured as any one of numerous types of aircraft flight deck displays. For example, it may be configured as a multi-function display, a horizontal situation indicator, or a vertical situation indicator. In the depicted embodiment of FIGS. 3 and 4, however, the display device is configured as a primary flight display (PFD) for an aircraft. Additionally, display device includes the display screen 32 that is operatively connected to display device. Display screen is configured to be controlled by display device and may be used to display any type of image including, but not limited to, textual, graphics, and iconic information. In some embodiments, display device may include multiple display screens and system 10 may include multiple display devices. In the depicted embodiment of FIG. 5, the display device is the guidance panel 34.

Figure 3:
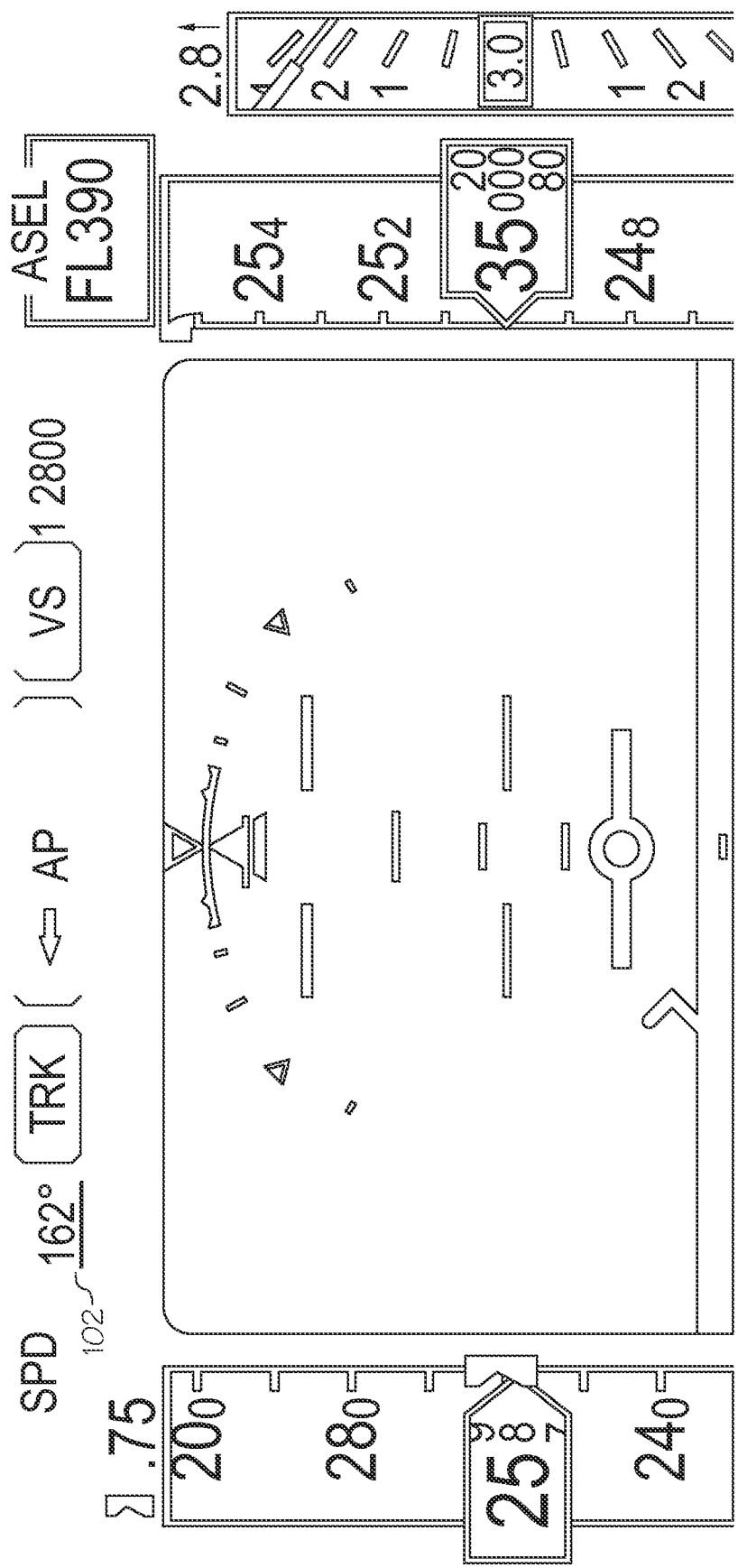
FIG. 3 is an exemplary display with a visual discrepancy alert generated by the system of FIG. 1, the visual discrepancy alert exemplified by underlining of an incorrect heading value.
Figure 4:
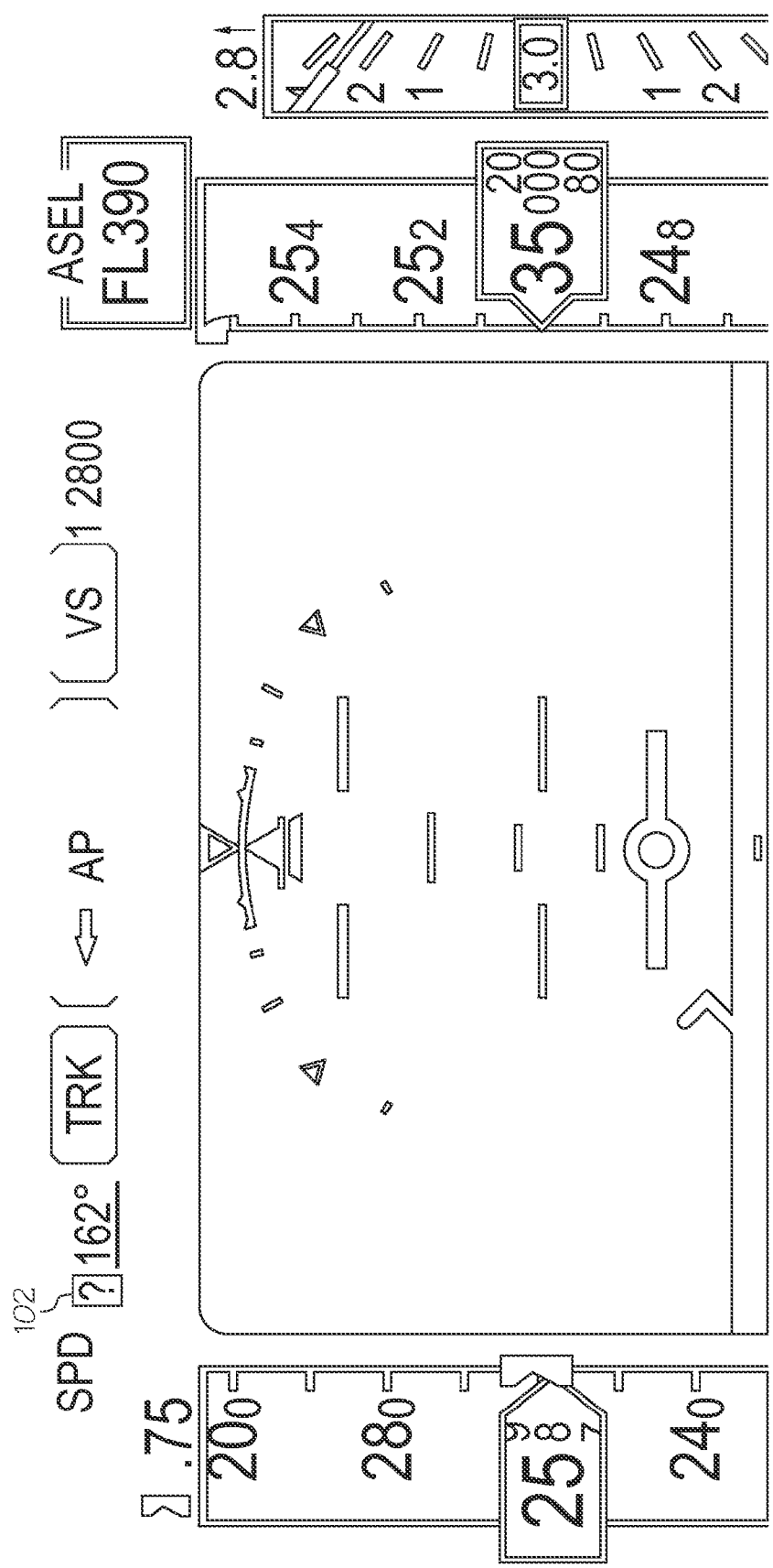
FIG. 4 is another exemplary display with a visual discrepancy alert displayed therein, the visual discrepancy alert exemplified by a question mark character proximate the incorrect heading value.

For example, in the illustrated embodiment depicted in FIGS. 3 and 4, processor is configured to send a command to display device instructing display device to display a visual discrepancy alert 102 on the display screen when non-compliant pilot action is detected. Display device is then configured to provide the visual discrepancy alert to the pilot or other flight crewmember. Processor 20 is configured to visually highlight the incorrect parameter, parameter value, or both by displaying the incorrect parameter, parameter value, or both with brighter color, intensity, special effects (e.g., flashing, underlining, etc.), special characters, or opacity different from the other information on the display screen, or using any other technique that would alert the pilot or other flight crew member that the parameter value in the outbound communication or the pilot action taken was non-compliant (i.e., incorrect). It should be understood that the exemplary techniques for visually highlighting the incorrect parameter, parameter value, or both described above are exemplary and do not comprise an exhaustive list of techniques that may be employed by processor to provide the visual discrepancy alert.

Figure 6:
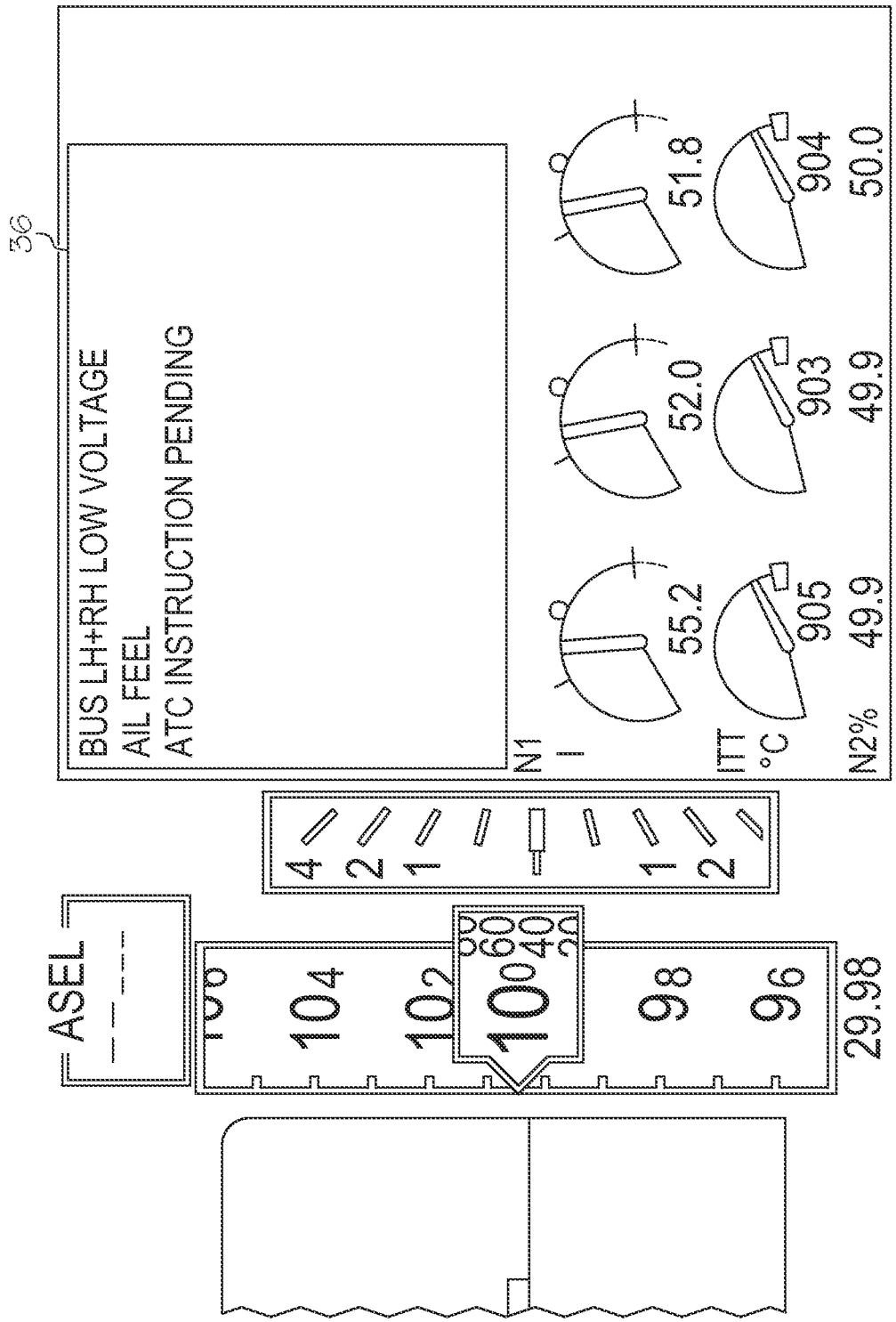
FIG. 6 depicts an exemplary visual timeout alert on an exemplary crew alerting system (CAS) window on a display screen of a display device.

Processor is also configured to output a timeout alert if a set time limit to take pilot action after acknowledgment is exceeded. The timeout alert reminds the pilot to take action (e.g., set settings) after having acknowledged the request for pilot action. A timeout alert may be, for example, a visual timeout alert, an aural timeout alert, a tactile timeout alert, an augmented reality timeout alert, etc, or combinations thereof. For example, FIG. 6 depicts an exemplary visual timeout alert ("ATC instruction pending") displayed on an exemplary crew alerting system (CAS) window 36 on the display screen. It should be understood that the exemplary techniques for outputting the timeout alert described above are exemplary and do not comprise an exhaustive list of techniques that may be employed to processor to output the timeout alert.

Figure 2:
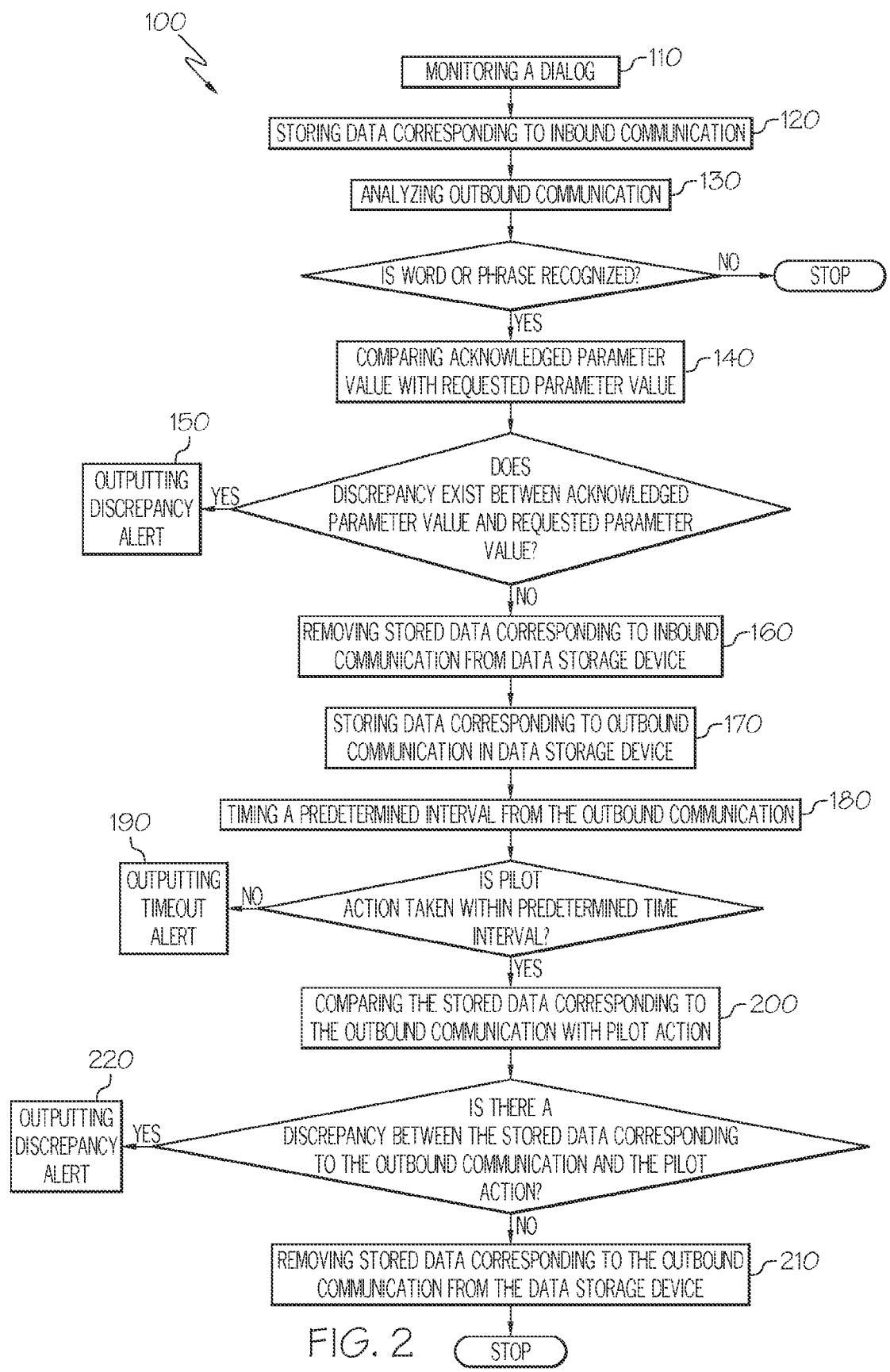
FIG. 2 is a flow chart of a method for detecting non-compliant pilot action according to another exemplary embodiment of the present invention.

FIG. 2 is a flow diagram of a computer-implemented method 100 for detecting non-compliant pilot action in accordance with exemplary embodiments of the present invention. In an exemplary embodiment, the method 100 begins by monitoring a dialog comprising an inbound communication from a ground location and an outbound communication from the aircraft relating to a request for pilot action (step 110). The request for pilot action is associated with a parameter and a parameter value. The parameter value in the request for pilot action is a "requested parameter value."

Method 100 for detecting non-compliant pilot action continues by storing data corresponding to the inbound communication in the data storage device (step 120). As noted previously, the stored data is digital data that has been recognized by the processor as relating to the parameter that is the subject of the request for pilot action (e.g., ALTITUDE, HEADING, ATTITUDE, FLIGHT LEVEL, QNH, SPEED, TRANSPONDER SETTING, FREQUENCY CHANGE, MONITOR, etc.) and the requested parameter value associated with the request for pilot action. The source (e.g., ATC, pilot) of the request for pilot action (i.e., the inbound communication) may also be stored in the data storage device. If the inbound communication is a voice communication (as opposed to a digital communication via the datalink system), the speech recognition module is first used to generate or produce the digital data derived from the voice communication. The digital communication via the datalink system may be directly stored in the data storage device or in an embodiment, the digital communication from the datalink system may first go to the processor to be analyzed to recognize a word or phrase as corresponding to the parameter and parameter value associated with the request for pilot action. If the word or phrase is recognized in the digital communication from the datalink system, the digital communication may then be stored in the data storage device.

Method 100 for detecting non-compliant pilot action continues by analyzing the outbound communication to recognize a word or phrase corresponding to the parameter associated with the request for pilot action (step 130). The outbound communication comprises an acknowledgment of the parameter and the parameter value requested in the inbound communication. The parameter value referred to in the outbound communication is referred to herein as "an acknowledged parameter value." If the outbound communication is a voice communication (as opposed to a digital communication via the datalink system), the speech recognition module is first used to generate or produce digital data derived from the voice communication. The digital data relates to the parameter of interest and the acknowledged parameter value. For example, in an inbound voice communication over the radio, ATC may state "Fly heading 100°". The pilot responds by pushing the push-to-talk (PTT) switch and reading back, in the outbound voice communication over the radio, "Fly heading 100°". Pressing the PTT, or any other button or triggering device, triggers the speech recognition module to digitalize the outbound voice communication. Once the PTT is released, the processor analyzes the outbound communication to recognize a word or phrase corresponding to the parameter associated with the request for pilot action. If the processor recognizes a word or phrase (here, the word "heading"), the digital data relating to the acknowledged parameter (here, the "heading") and the acknowledged parameter value (here, the value 100) are stored in the data storage device.

If the word or phrase corresponding to the parameter (e.g., ALTITUDE, HEADING, ATTITUDE, FLIGHT LEVEL, QNH, SPEED, TRANSPONDER SETTING, FREQUENCY CHANGE, MONITOR, etc.) associated with the request for pilot action is recognized in the outbound communication, method 100 for detecting non-compliant pilot action continues by comparing the stored data from the outbound communication with the stored data from the inbound communication to determine if a discrepancy exists between the acknowledged parameter value and the requested parameter value (step 140). The stored data from the outbound communication with also compared with the stored data from the inbound communication to determine if a discrepancy exists between the acknowledged parameter and the requested parameter (not shown in FIG. 2)

Method 100 for detecting non-compliant pilot action continues by outputting a discrepancy alert if a discrepancy is determined to exist (step 150). Under normal circumstances, any discrepancy between the request for pilot action (inbound communication) and the acknowledgment (outbound communication) would immediately be detected by, for example, ATC or a crewmember. However, in the rare circumstance where the discrepancy is not immediately detected, the system will automatically detect the discrepancy, if any, between the request for pilot action and the acknowledgment. If the system outputs a discrepancy alert, the pilot is alerted to an error in his/her acknowledgement and can request clarification or confirmation of the request for pilot action from the ground location.

As noted previously, the discrepancy alert may be any technique that would alert the pilot or other flight crew member of the discrepancy (in this case, between the request for pilot action and the acknowledgment). For example, a visual discrepancy alert may be displayed on the display screen of the display device as depicted in FIGS. 3 and 4, on the guidance panel 34, on an augmented reality display (such as associated with Google® Glass), etc., or combinations thereof. If there is no discrepancy between the request for pilot action and the acknowledgment (more specifically, between the requested parameter and the acknowledged parameter or between the requested parameter value and the acknowledged parameter value), method 100 continues by optionally removing the stored data corresponding to the inbound communication from the data storage device (step 160) and storing the data corresponding to the outbound communication in the data storage device (step 170). The removal of stored data corresponding to the inbound communication indicates that the data is no longer needed, as it has already been determined by the processor that there is no discrepancy between the request for pilot action and the acknowledgment. While the stored data corresponding to the inbound communication may be removed prior to storing the data corresponding to the outbound communication in the data storage device, or at any time thereafter, it is to be understood that it is not necessary that it be removed from the data storage device at all.

Method 100 for detecting non-compliant pilot action continues by timing a predetermined time interval from the outbound communication (step 180) and outputting a timeout alert at a timeout of the predetermined time interval unless the requested pilot action is taken within the predetermined time interval (step 190). The timeout alert reminds the pilot to take the requested pilot action that has already been acknowledged but not yet performed. This reminder helps prevent a situation in which the pilot has acknowledged the request for pilot action, but then forgets to perform (i.e., take) the requested pilot action.

Method 100 for detecting non-compliant pilot action continues by comparing the stored data corresponding to the outbound communication with the pilot action taken to determine if a discrepancy exists between the pilot action taken and the stored data (step 200). If there is no discrepancy, the stored data corresponding to the outbound communication may be removed from the data storage device (step 210). If the discrepancy exists between the pilot action and the stored data, the pilot action is determined to be non-compliant. The discrepancy may relate to an incorrect parameter or an incorrect parameter value.

Method 100 continues by outputting a discrepancy alert if the discrepancy exists between the pilot action and the stored action (step 220). FIGS. 3 and 4 are exemplary visual displays generated and presented to a pilot by system 10. The images displayed on display screen of the display device include an exemplary visual discrepancy alert. For example, FIG. 3 depicts a display screen in in which an incorrect heading value is underlined. FIG. 4 depicts a display screen in which a question mark appears next to the incorrect heading value. It should be appreciated that the display screen as depicted in FIGS. 3 and 4 represent the state of a dynamic display frozen at one particular time, and that the display screen may be continuously refreshed during operation of the aircraft to reflect aircraft status changes. In addition, it should be appreciated that while the visual discrepancy alert in FIGS. 3 and 4 relates to an incorrect heading value, the visual discrepancy alert may be used for any incorrect parameter or parameter value. The exemplary visual alert is such that the text, symbology, and/or a number corresponding to the incorrect parameter or incorrect parameter value may be displayed with special effects (e.g., flashing, underlining), special characters (e.g., question mark), color change, intensity, or opacity different from the other information on the display screen, or by using any other visually distinguishing or highlighting technique that would alert the pilot that the pilot action taken was non-compliant. It should be understood that the visually distinguishing techniques depicted in FIGS. 3 (underlining) and 4 (question mark) and described above are exemplary and do not comprise an exhaustive list of techniques that may be employed by processor to provide the visual discrepancy alert. It is also to be understood that the discrepancy alert may be other than a visual discrepancy alert; the discrepancy alert may be any technique (e.g., aural, tactile, etc.) that would alert the pilot that the pilot action taken was non-compliant (or that there was a discrepancy between the acknowledgement and request for pilot action as previously noted), i.e., discrepancy alerts outputted in steps 150 and 220 and the timeout alert outputted in step 190 (FIG. 2) may be any type of alert (e.g., visual, aural, tactile, combinations thereof, etc.). The alert types used in each of steps 150, 190, 220 may be the same or different.

The present invention is further described in detail through the following example. However, the scope of the present invention is by no means restricted or limited by the example, which only has an illustrative purpose.

EXAMPLE

The pilot or other flight crewmember receives an inbound voice communication from, for example, an air traffic controller. For example, the pilot or other flight crewmember may receive instructions such as: "Descend Altitude 7000 feet, QNH 1002" comprising the request for pilot action. With QNH set, an aircraft altimeter indicates height above mean sea level. The QNH may be the pressure observed at the airfield, or the lowest pressure observed throughout a specified geographical area. The pilot or other flight crewmember may press the PTT button and read back to ATC "Descend altitude 7000 feet, QNH 1002" (the acknowledgment). This is the outbound communication. In this example, the speech recognition module digitalizes the outbound voice communication and the processor detects the word "altitude" in the digital signal and stores it together with the value "7000" in the data storage device; it also detects "QNH" and stores it with the value "1002." The pilot or other flight crewmember thereafter sets a value of "7000" in the altitude window on the guidance panel (the exemplary pilot action). The processor compares the pilot action (setting of the altitude value of 7000) with the stored altitude data (altitude 7000) and determines if there is a discrepancy between the pilot action and the stored data. As there is no difference (discrepancy) in this example, the stored altitude data may be removed from the data storage device. Next, the pilot sets a value of "1020" in the QNH window on the primary flight display or on the guidance panel. The processor compares the pilot action (setting of the QNH value of 1020) with the stored QNH data (QNH 1002) and determines if there is a difference (discrepancy) between the pilot action and the stored data (the QNH data in this example). As there is a difference in the pilot action and the stored QNH data (QNH 1020 versus QNH 1002), the processor outputs a discrepancy alert, indicating a non-compliant pilot action (i.e., incorrect QNH value in this example). The pilot can then correct the error by resetting the correct QNH value. The processor compares the corrective pilot action (setting of the corrected QNH value) with the stored QNH value and determines there is no difference between the corrective pilot action and the stored data. The stored QNH value may then be removed from the data storage device.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The methods and systems according to exemplary embodiments as herein described detect non-compliant pilot action by cross-checking compliance with requests for pilot action, thereby resulting in increased flight safety and communication efficiency. The methods and systems as described herein are particularly helpful in single pilot operations where such cross-checking by another pilot is unavailable, enabling the single pilot to verify that his/her action complies with the request for pilot action.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for detecting non-compliant pilot action configured to be performed by a processor, the processor configured to perform the method comprising the steps of:
    analyzing an outbound communication from an aircraft by a speech recognition module to recognize a word or phrase corresponding to a parameter associated with a prior request for a pilot action to set a parameter value on a flight guidance control panel of the aircraft, the flight guidance control panel including controls for setting different parameters, and based on the recognition, the method further comprising:
    storing data corresponding to the outbound communication in a data storage device onboard the aircraft;
    determining the pilot action has been performed to set the parameter value on the flight guidance control panel of the aircraft;
    comparing the stored data with the parameter value set by the pilot action;
    determining a discrepancy exists between the parameter value set by the pilot action and the stored data; and
    outputting a discrepancy alert based on the determination.

2. The method of claim 1, further comprising the steps of:
    timing a predetermined time interval from the outbound communication; and outputting a timeout alert at a timeout of the predetermined time interval unless the requested pilot action is taken within the predetermined time interval.

3. The method of claim 1, wherein the outbound communication comprises an outbound voice communication, the method further comprising the step of:
    producing digital data corresponding to the outbound voice communication with the speech recognition module; and the step of:
    storing data comprises storing the digital data in the data storage device.

4. The method of claim 1, further comprising the step of:
    removing the stored data from the data storage device if the determining step determines there is no discrepancy between the pilot action and the stored data.

5. The method of claim 1, further comprising the steps of:
    monitoring an inbound communication from a ground location, the inbound communication comprising the prior request for pilot action;
    storing data corresponding to the inbound communication in the data storage device;
    comparing the stored data corresponding to the inbound communication with the stored data corresponding to the outbound communication;
    determining if there is a difference between the stored data corresponding to the inbound communication and the stored data corresponding to the outbound communication; and
    outputting a discrepancy alert if there is a difference between the stored data corresponding to the inbound communication and the stored data corresponding to the outbound communication.

6. The method of claim 5, further comprising the step of:
    removing the stored data corresponding to the inbound communication from the data storage device based on the determination that there is no difference between the stored data corresponding to the inbound communication and the stored data corresponding to the outbound communication.

7. The method of claim 5, wherein the inbound communication comprises an inbound voice communication, the method further comprising the steps of:
    producing digital data corresponding to the inbound voice communication with the speech recognition module; and the step of:
    storing data comprises storing the digital data corresponding to the inbound voice communication in the data storage device.

8. The method of claim 1, wherein the pilot takes corrective pilot action based on the determination of the discrepancy, the method further comprising the steps of:
    comparing the stored data corresponding to the outbound communication with the corrective pilot action;
    determining a difference exists between the corrective pilot action and the stored data corresponding to the outbound communication; and outputting the discrepancy alert based on the determination of the difference between the corrective pilot action and the stored data corresponding to the outbound communication, wherein the comparing, determining, and outputting the discrepancy alert steps are repeated until there is no difference between the corrective pilot action and the stored data corresponding to the outbound communication.

9. A method for detecting non-compliant pilot action configured to be performed by a processor, the processor configured to perform the method comprising the steps of:

monitoring a dialog with a speech recognition module comprising an inbound communication from a ground location and an outbound communication from an aircraft relating to a request for pilot action;

analyzing the inbound and outbound communications to recognize a word or phrase corresponding to a requested parameter associated with the request for a pilot action to set a parameter value on a flight guidance control panel of the aircraft, an acknowledged parameter and an acknowledged parameter value, the flight guidance control panel including controls for setting different parameters;

storing data corresponding to the inbound communication in a data storage device, the stored data relating to the requested parameter and the parameter value associated with the request for pilot action;

storing data corresponding to the outbound communication in the data storage device, the stored data relating to the acknowledged parameter and the acknowledged parameter value;

determining the pilot action has been performed to set the parameter value on the flight guidance control panel of the aircraft;

comparing the stored data relating to the acknowledged parameter and the acknowledged parameter value with the pilot action;

determining a discrepancy exists between the stored data corresponding to the acknowledged parameter value and the parameter value set by the pilot action on the flight guidance control panel of the aircraft;

outputting a discrepancy alert based on the determination;

determining whether a corrective pilot action is taken in response to the discrepancy alert to reset the parameter value on the flight guidance control panel of the aircraft;

based on the corrective pilot action, determining a difference between the corrective pilot action and the stored data corresponding to the outbound communication; and outputting the discrepancy alert based on the determination of the difference between the corrective pilot action and the stored data corresponding to the outbound communication.

10. The method of claim 9, further comprising the step of:

removing the stored data corresponding to the inbound communication from the data storage device if the comparing step determines that no discrepancy exists.

11. The method of claim 9, further comprising the steps of:

timing a predetermined time interval from the outbound communication; and outputting a timeout alert at a timeout of the predetermined time interval unless the pilot action is taken within the predetermined time interval.

12. The method of claim 9, wherein at least one of the inbound communication or the outbound communication comprises a voice communication, the method further comprising the steps of:

producing digital data corresponding to the voice communication with the speech recognition module, and the step of storing data comprise storing the digital data.

13. The method of claim 11, wherein the steps of outputting a timeout alert, a discrepancy alert, or both, comprise outputting a visual alert and outputting the visual alert comprises displaying the visual alert on a display screen of a display device, on a guidance panel, or an augmented reality display, or on combinations thereof.

14. The method of claim 9 further comprising the steps of:

comparing the stored data corresponding to the outbound communication with the corrective pilot action, wherein the comparing, determining of the difference between the corrective pilot action and the stored data corresponding to the outbound communication, and outputting the discrepancy alert steps are repeated until there is no difference between the corrective pilot action and the stored data.

15. A system for detecting non-compliant pilot action, the system comprising:

a communications system configured to support an inbound communication from a ground location relating to a request for pilot action to set a parameter value on a flight guidance control panel of the aircraft and an outbound communication from an aircraft comprising an acknowledgment of the request for pilot action, the request for pilot action associated with a parameter and the parameter value and the acknowledgement associated with the parameter and an acknowledged parameter value, the flight guidance control panel including controls for setting different parameters;

a data storage device onboard the aircraft containing a database with stored digital data relating to the request for pilot action and the acknowledgment of the request for pilot action;

a processor coupled to the communications system and the data storage device to receive the stored digital data and configured, in response thereto, to:

determine the pilot action was taken to set the acknowledged parameter value on the flight guidance control panel of the aircraft;

compare the stored digital data with the pilot action and determine a discrepancy exists between the pilot action taken and the stored digital data;

output a discrepancy alert based on the determination, the discrepancy alert indicating a non-compliant pilot action;

determine whether a corrective pilot action was taken to reset the acknowledged parameter value; and output the discrepancy alert based on a determination of a discrepancy between the corrective pilot action and the stored digital data, wherein at least one of the inbound communication or the outbound communication comprises a voice communication, the system further comprising a speech recognition module configured to produce the digital data from the voice communication for storage in the data storage device.

16. The system of claim 15, wherein the processor is further configured to output a timeout alert at a timeout of a predetermined time interval from the outbound communication unless the requested pilot action is taken within the predetermined time interval.

\* \* \* \* \*